(12) United States Patent
de Rooij et al.

(10) Patent No.: US 8,023,297 B2
(45) Date of Patent: Sep. 20, 2011

(54) HIGH EFFICIENCY PHOTOVOLTAIC INVERTER

(75) Inventors: Michael Andrew de Rooij, Schenectady, NY (US); John Stanley Glaser, Niskayuna, NY (US); Robert Louis Steigerwald, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 596 days.

(21) Appl. No.: 12/215,505

(22) Filed: Jun. 27, 2008

(65) Prior Publication Data

US 2009/0323379 A1    Dec. 31, 2009

(51) Int. Cl.
*H02M 7/5387*    (2007.01)
(52) U.S. Cl. .................................................. 363/132
(58) Field of Classification Search .............. 323/222, 323/268, 271, 282, 283; 363/97, 98, 131, 363/132
See application file for complete search history.

(56) References Cited

U.S. PATENT DOCUMENTS

| | | | |
|---|---|---|---|
| 6,556,462 | B1 | 4/2003 | Steigerwald et al. |
| 7,099,169 | B2 * | 8/2006 | West et al. ................ 363/132 |
| 7,440,300 | B2 * | 10/2008 | Konishi et al. ............ 363/132 |
| 2004/0022077 | A1 | 2/2004 | Steigerwald et al. ...... 363/39 |
| 2005/0073865 | A1 | 4/2005 | Steigerwald et al. ...... 363/47 |
| 2005/0139259 | A1 | 6/2005 | Steigerwald et al. ...... 136/293 |

FOREIGN PATENT DOCUMENTS

EP    1227599  A3    2/2004

OTHER PUBLICATIONS

"High-Frequency Isolated 4kW Photovoltaic Inverter For Utility Interface", Alan Cocconi et al., Proceedings of the Seventh International PCI'83 Conference, Sep. 13-15, pp. 325-345, 1983, Geneva, Switzerland.
EP Search Report; Application No. 09163101.0-2207; Oct. 27, 2009.
Balaji Siva Prasad, Sachin Jain, Vivek Agarwal, "Universal Single-Stage Grid-Connected Inverter", IEEE Transactions On Energy Conversion, vol. 23, No. 1, Mar. 2008, pp. 128-137.
S. Ali Khajehoddin, Alireza Bakhshai, Praveen Jain, Josef Drobnik, "A Robust Power Decoupler and Maximum Power Point Tracker Topology for a Grid-Connected Photovoltaic System", Power Electronics Specialists Conference, 2008, PESC 2008, IEEE, Piscataway, NJ, USA, Jun. 15, 2008, pp. 66-69.
Hang-Seok Choi, Y. J. Cho, J. D. Kim, B. H. Cho, "Grid-Connected Photovoltaic Inverter with Zero-Current Switching", (Online), May 5, 2005, XP002550261, retrieved from the Internet: URL:http://web.archive.org/web/20050505213628/http://pearlx.snu.ac.kr/Publication/IC,PE0101.pdf>.
Michael J. Schutten, Robert L. Steigerwald, Juan A. Sabate, "Ripple Current Cancellation Circuit", APEC 2003, 18th Annual IEEE Applied Power Electronics Conference and Exposition, Miami beach, FL, Feb. 9-13, 2003; [Annual Applied Power Electronics Conference], New York, NY: IEEE, US, vol. 1, Feb. 9, 2003, pp. 464-470.
EP 1227599 (A2) English Abstract, Pub. date: Apr. 2, 2004.

* cited by examiner

*Primary Examiner* — Matthew Nguyen
(74) *Attorney, Agent, or Firm* — Ann M. Agosti

(57) ABSTRACT

A photovoltaic (PV) inverter includes a single DC to AC converter configured to operate solely in a buck mode for PV array voltage levels greater than a connected power grid instantaneous voltage plus converter margin, and further configured to operate solely in a boost mode for PV array voltage levels plus margin less than the connected power grid instantaneous voltage, such that the PV inverter generates a rectified sine wave current in response to the available PV array power, and further such that the PV inverter generates a utility grid current in response to the rectified sine wave current.

19 Claims, 4 Drawing Sheets

HIGH EFFICIENCY PHOTOVOLTAIC INVERTER

BACKGROUND

The invention relates generally to electronic power conversion and more particularly to a very high conversion efficiency, grid connected, single phase photovoltaic (PV) inverter.

Photovoltaic (PV) cells generate direct current (DC) power with the level of DC current being dependent on solar irradiation and the level of DC voltage dependent on temperature. When alternating current (AC) power is desired, an inverter is used to convert the DC energy into AC energy. Typical PV inverters employ two stages for power processing with the first stage configured for providing a constant DC voltage and the second stage configured for converting the constant DC voltage to AC current. Often, the first stage includes a boost converter, and the second stage includes a single-phase or three-phase inverter system. The efficiency of the two-stage inverter is an important parameter affecting PV system performance and is a multiple of the individual stage efficiencies with each stage typically causing one-half of the system losses.

Single phase photovoltaic inverters generally require a two-stage conversion power circuit to convert the varying DC voltage of a PV array to the fixed frequency AC voltage of the grid. Traditional PV inverters use a DC link as the intermediate energy storage step, which means that the converter first converts the stable DC voltage to a current that can be injected into the grid.

Traditional single phase PV inverters also undesirably control the power circuits with a fixed switching frequency using a plurality i.e. five, of switching devices that contribute to the overall switching losses. Switching losses are typically kept as low as possible when using traditional PV inverters by keeping the switching frequency low.

It would be both advantageous and beneficial to provide a residential photovoltaic inverter that employs fewer high frequency switching devices than that employed by a traditional PV inverter. It would be further advantageous if the PV inverter could employ adaptive digital control techniques to ensure the PV inverter is always operating at peak efficiency.

BRIEF DESCRIPTION

Briefly, in accordance with one embodiment, a photovoltaic (PV) inverter comprises:
  a buck converter configured to generate a rectified sine wave current in response to an available PV array power driven voltage plus converter operating margin whenever it is greater than a utility grid voltage; and
  a current unfolding circuit configured to inject a current into the utility grid in response to the rectified sine wave current.

According to another embodiment, a photovoltaic (PV) inverter comprises a single DC to AC converter configured to operate in a buck mode for PV array voltage levels greater than a connected utility grid's instantaneous voltage plus converter operating margin, and further configured to operate in a boost mode for PV array voltage levels plus margin less than the connected utility grid voltage, such that the PV inverter generates a rectified sine wave current in response to the available PV array power, and further such that the PV inverter generates a utility grid current in response to the rectified sine wave current.

According to yet another embodiment, a photovoltaic (PV) inverter is configured to operate as a buck converter when an instantaneous utility grid voltage minus converter operating margin is lower than a PV array voltage and as a boost converter when the instantaneous utility grid voltage minus converter operating margin is higher than the PV array voltage.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
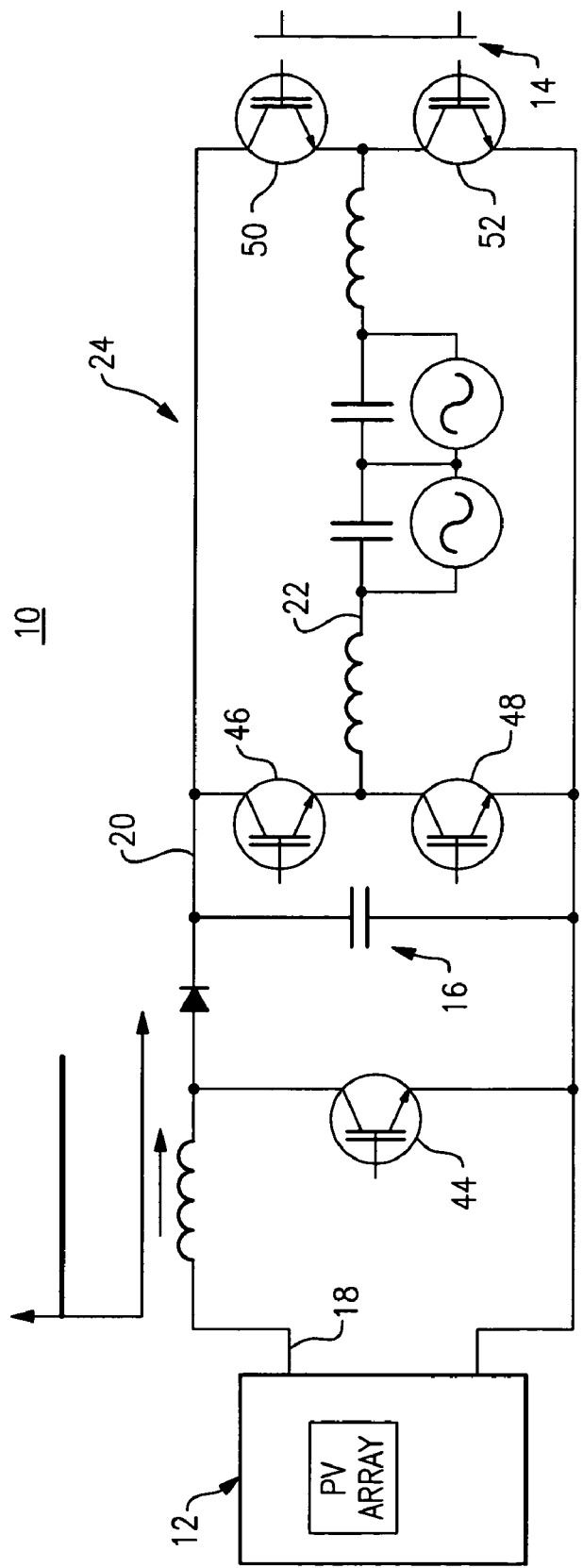
FIG. 1 is illustrates a photovoltaic inverter topology that is known in the art.

FIG. 1 is illustrates a photovoltaic inverter 10 topology that is known in the art. Photovoltaic inverter 10 employs a two-stage power circuit to convert a varying DC voltage of a PV array 12 to a fixed frequency AC voltage for a power grid 14. Photovoltaic inverter 10 uses a DC link 16 to implement the intermediate energy storage step. This means the PV inverter 10 first converts the unstable PV DC voltage 18 to a stable DC voltage 20 that is greater than the grid voltage via a boost converter, and subsequently converts the stable DC voltage 20 to a current 22 via a PWM circuit 24 that can then be injected into the grid 14. Photovoltaic inverter 10 topology employs five switching devices 44, 46, 48, 50, 52 that are switching at a high frequency and that undesirably contribute to the overall switching losses of the two-stage converter.

Figure 2:
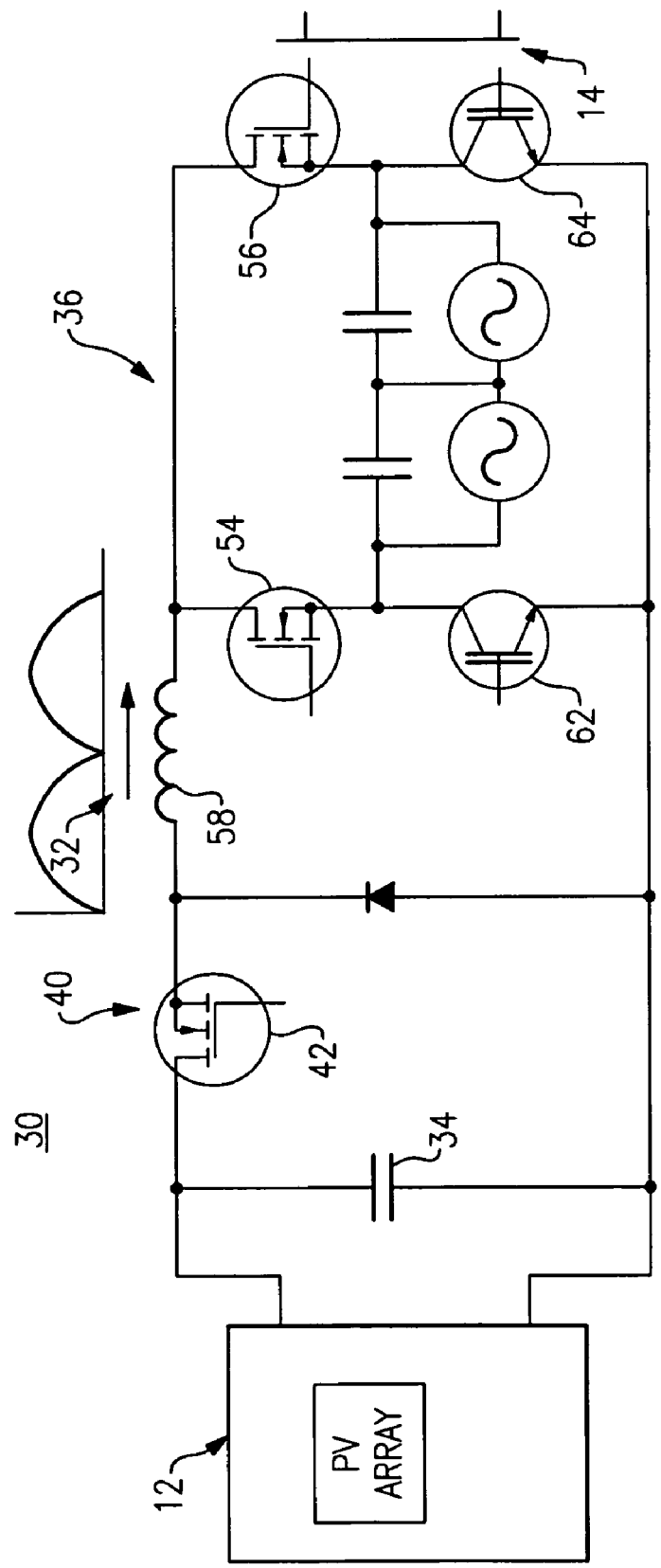
FIG. 2 illustrates a photovoltaic inverter topology according to one embodiment of the invention.

FIG. 2 illustrates a photovoltaic inverter 30 hard-switching topology according to one embodiment of the invention. Photovoltaic inverter 30 topology overcomes the necessity to employ a DC link to implement an intermediate energy storage step such as described above with reference to FIG. 1, because PV inverter 30 topology converts the PV array 12 voltage immediately into a current 32 that is the equivalent of a rectified grid current. This feature is implemented by stiffening the PV array 12 with a large capacitance 34, effectively shifting the DC link to the PV array 12. The subsequent inverter stage 36 merely needs to unfold the current 32 into the grid 14, and does so without switching losses. The first stage 40 is thus the only stage that has switching losses from a single device 42 verses the traditional converter that has five switching devices 44, 46, 48, 50, 52 such as depicted in FIG.

1 that have switching losses. Photovoltaic inverter 30 is configured to operate in a boost mode at low input voltages by switching devices 54, 56 and maintaining device 40 on, thereby eliminating it's switching losses, so that devices 54 and 56 will be the only devices contributing to the switching losses during this boost mode only.

In further explanation, photovoltaic inverter 30 utilizes a single high speed switch 42 when it operates in a buck mode described in further detail below. Photovoltaic inverter 30 also utilizes a pair of high speed switches 54, 56 when it operates in a boost mode described in detail below.

Traditional inverters such as described above with reference to FIG. 1, control the power circuits with a fixed switching frequency. The present inventors recognized that when the conversion efficiencies are very high, improvements can be gained by use of adaptive digital control techniques. An adaptive digital controller can thus be employed that adjusts the switching frequency to compensate for changes in the semiconductor devices 42, 54, 56 and inductor 58 performance for various operating conditions and temperatures so that the highest possible conversion efficiency is obtained.

In summary explanation, a photovoltaic inverter 30 topology advantageously functions with a significant reduction in the number of power electronic devices that will be switching at a high frequency at any point in time. This feature provides an additional benefit that results due to lower conduction losses associated with slower devices that can be selected to complete the inverter system.

The series path from the source to the utility depicted in FIG. 2 also has the least possible number of components to keep conduction losses low. Photovoltaic inverter 10 shown in FIG. 1 employs three switches and two inductors in series verses the photovoltaic inverter 30 shown in FIG. 2 that has three switches, one of which is optimized for very low conduction losses, and only one inductor 58.

The photovoltaic array source 12 is stiffened via a large capacitance 34 such as described above. This large capacitance 34 advantageously does not compromise the safety aspects of the system as the PV source 12 is current limited.

Attached to the capacitor 34 is the first stage buck converter 40 that creates a full wave rectified sine current in the main inductor 58. This current is then unfolded into the grid 14 by the full bridge inverter 36 connected to the output of the PV inverter 30.

The PV inverter 30 topology was found to provide suitable working results so long as the PV source voltage remains higher than the grid voltage. In cases where the PV source 12 voltage is less than the grid 14 voltage, the operation of the PV inverter 30 is configured to ensure that the current in the main inductor 58 always flows from the PV source 12 to the grid 14. This is achieved by turning on the bucking switch 42 continuously and high frequency switching the two low side devices 54, 56 of the full bridge inverter 36 using conventional Pulse Width Modulation (PWM) techniques. The PV inverter 30 thus operates in a boost mode when the PV source 12 voltage is less than the grid 14 voltage. This boost mode advantageously is active only during the portion of the sine wave output voltage that is higher than the PV source 12 voltage.

According to one embodiment, during the positive half of the rectification cycle, the bottom left switch 62 is permanently turned on, the bottom right switch 64 is permanently turned off, and the upper two switches 54, 56 are modulated to generate a boosting current that is injected into the grid 14.

During the negative portion of the rectification cycle, the bottom right switch 64 is permanently turned on, the bottom left switch 62 is permanently turned off, and the upper two switches 54, 56 are modulated to shape the boosting current and inject the boosting current into the grid 14.

Inverter 36 can just as easily function to generate the requisite boosting current by turning the upper right switch 56 on during the negative portion of the rectification cycle while the upper left switch 54 is turned off, and then modulating the lower two switches 62, 64 to shape the boosting current and inject the boosting current into the grid 14. When the lower two switches 62, 64 are modulated to generate the boosting current, the upper left switch 54 is then turned on during the positive portion of the rectification cycle.

Because current boosting is employed only when necessary, i.e. when the PV array 12 voltage is lower than the grid 14 voltage, inverter switching efficiency is increased above that achievable when compared to a conventional PV converter topology such as described above with reference to FIG. 1.

Figure 3:
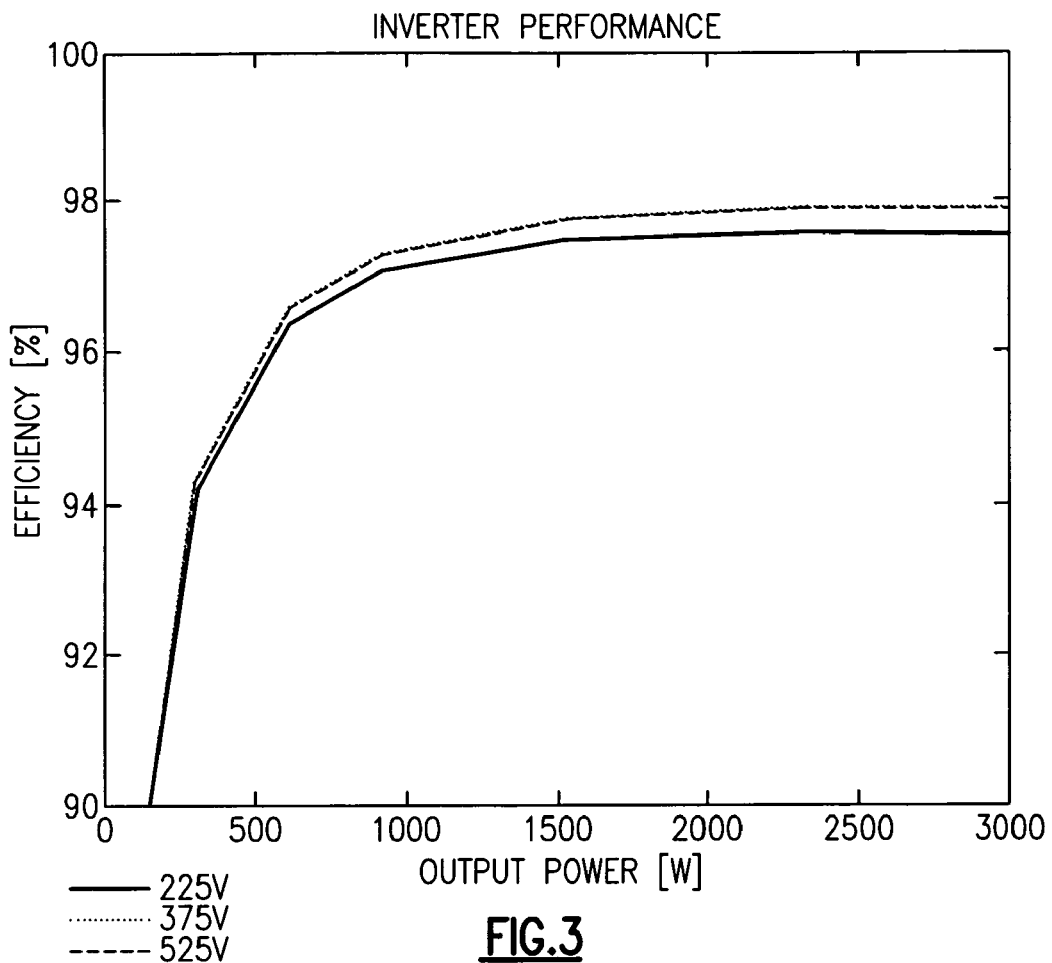
FIG. 3 is a graph illustrating simulated inverter performance for a photovoltaic inverter hard-switching topology according to one embodiment of the invention.
Figure 4:
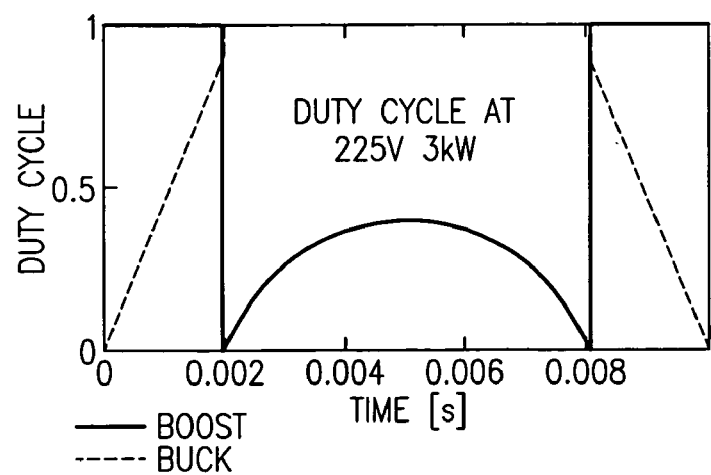
FIG. 4 is a graph illustrating a buck-boost duty cycle employed to achieve the simulated inverter performance depicted in FIG. 3.

FIG. 3 is a graph illustrating simulated inverter performance for a photovoltaic inverter hard-switching topology according to one embodiment of the invention. The inverter efficiency can be seen to range between 90% and close to 98% when generating output power levels between about 150 Watts and about 3000 Watts using the buck-boost duty cycle depicted in FIG. 4.

Photovoltaic inverter 30 can just as easily be implemented using soft-switching techniques to further improve conversion efficiency according to another embodiment of the invention that also employs the same low number of devices switching at a high frequency. The use of soft switching topology allows slower devices having lower conduction losses to be selected for use in the current 32 unfolding portion of the respective PV inverter. PV inverter 30 utilizes a topology well suited to use of adaptive digital control methods for seeking the most efficient operating point for the system based on operating conditions such as, without limitation, temperature, input voltage and load power level.

Figure 5:
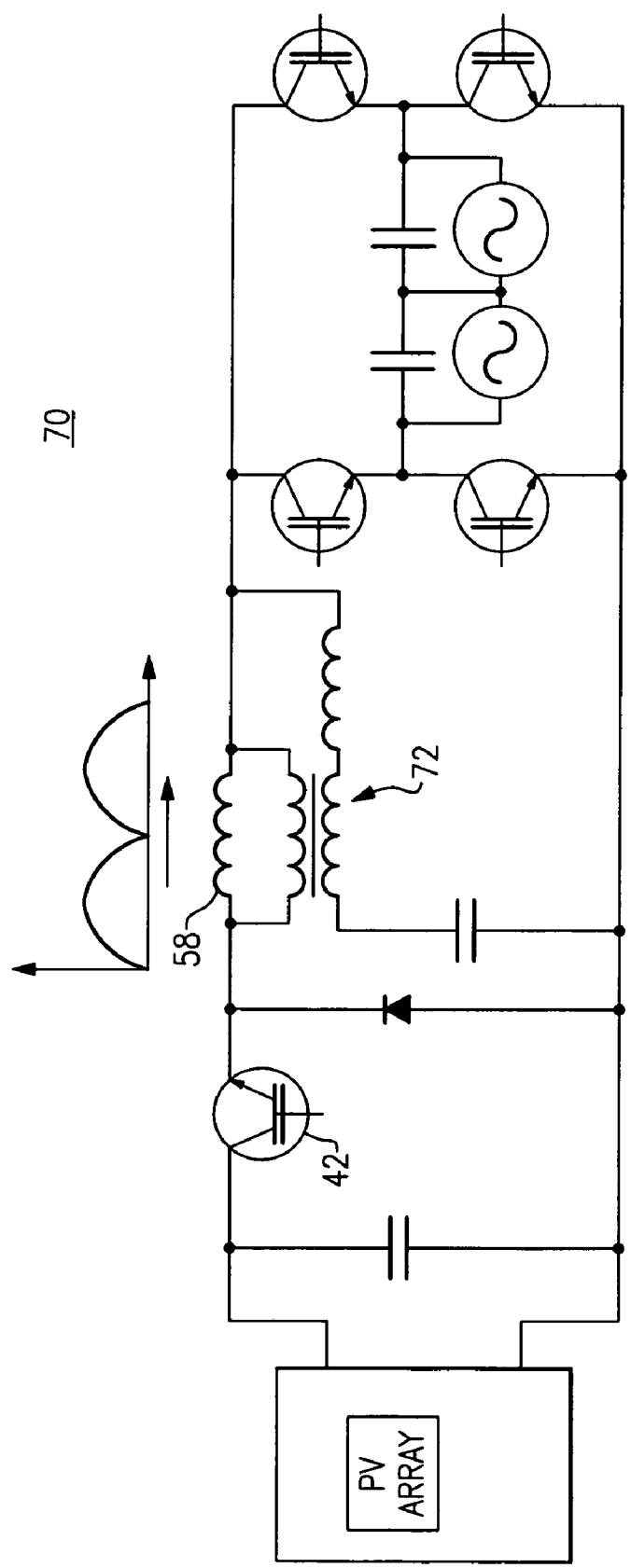
FIG. 5 illustrates a photovoltaic inverter topology including a ripple current cancellation circuit according to still another embodiment of the invention.

Looking now at FIG. 5, a PV inverter 70 topology includes a ripple current cancellation circuit 72 that provides a means for reducing the main inductor 58 size without compromising the output ripple current requirements of the system. Ripple current cancellation circuit 72 allows use of a smaller inductor 58 having lower losses than that achievable with a larger inductor, and also allows use of quasi resonant switching, significantly reducing switching losses of the main device 42.

Advantages provided by the PV inverter 30, 70 topologies include without limitation, buck and boost capabilities incorporated into a single DC to AC converter without employment of a conventional buck/boost topology. Other advantages include, without limitation, the use of multiple technologies within a single PV inverter to enhance the high efficiency topology, such as the ripple current cancellation capabilities described above with reference to FIG. 5, the use of quasi-resonant switching, a topology that is well suited to use of adaptive digital control methods for seeking the most efficient operating point for the system based on operating conditions such as, without limitation, temperature, input voltage and load power level, and optional step activation of the AC contactor.

Maximizing efficiency by minimizing the number of series power semiconductors switched between the source and the load, and the selection of power semiconductors to achieve maximum efficiency provide further advantages over known PV inverters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A photovoltaic (PV) inverter comprising:
   a buck converter configured to generate a rectified sine wave current in response to an available PV array power and utility grid voltage;
   a current unfolding output circuit configured to control the current injected into a utility grid in response to the rectified sine wave current whenever the PV array voltage plus converter operating margin is greater than the utility grid voltage; and
   a stiffening capacitor between the PV array and the buck converter, the stiffening capacitor configured together with the buck converter to generate the rectified sine wave current in the absence of a DC link between the buck converter and the current unfolding circuit.

2. The PV inverter according to claim 1, wherein the buck converter comprises no more than one high frequency switching device and the current unfolding circuit comprises no more than two high frequency switching devices, and further wherein the no more than two high frequency switching devices are configured to high frequency switch only when the PV array voltage plus converter operating margin is less than the instantaneous utility grid voltage.

3. The PV inverter according to claim 1, wherein the buck converter is held on to stop switching, and the current unfolding circuit is configured to function in a boosting mode at PV array voltages plus converter operating margin lower than the utility grid voltage and in a buck mode with output unfolder at PV array voltages plus converter operating margin higher than the utility grid voltage.

4. The PV inverter according to claim 1, wherein the buck converter comprises no more than one high frequency switching device, and further wherein the no more than one high frequency switching device is the sole PV inverter switching device operating in a high frequency switching mode when the PV inverter is operating in a buck mode.

5. The PV inverter according to claim 1, further comprising an adaptive digital controller configured to adjust a buck-boost switching frequency associated with the buck converter and current unfolding circuit in response to desired operational characteristics to achieve a PV inverter efficiency greater than that achievable using fixed switching frequency PV inverter techniques.

6. The PV inverter according to claim 5, wherein the desired operational characteristics are selected from PV array voltage levels, PV inverter ambient operating temperatures, PV inverter switching device temperatures, and grid power levels.

7. The PV inverter according to claim 1, wherein the PV inverter comprises no more than one high frequency switching device such that the PV inverter has less inherent EMI generation than a PV inverter comprising a plurality of high frequency switching devices.

8. A photovoltaic inverter comprising a single DC to AC converter configured to operate solely in a buck mode for PV array voltage levels greater than a connected utility grid's instantaneous voltage plus converter operating margin, and further configured to operate solely in a boost mode for PV array voltage levels plus margin less than the connected utility grid voltage, such that the PV inverter generates a rectified sine wave current in response to the available PV array power, and further such that the PV inverter generates a utility grid current in response to the rectified sine wave current, wherein the DC to AC converter comprises:
   a buck converter configured to generate a full wave rectified sine wave current in response to available PV array power and a utility grid voltage
   a full bridge unfolding output circuit configured to generate a utility grid current in response to the full wave rectified sine wave current whenever the PV array voltage plus converter operating margin is greater than the utility grid voltage; and
   a stiffening capacitor between the PV array and the DC to AC converter, the stiffening capacitor configured together with the DC to AC converter to generate the full wave rectified sine wave current in the absence of a DC link between the buck converter and the full bridge unfolding circuit.

9. The PV inverter according to claim 8, wherein the buck converter comprises no more than one high frequency switching device and the unfolding circuit comprises no more than two high frequency switching devices, and further wherein the no more than two high frequency switching devices are configured to high frequency switch only when the PV array voltage plus converter operating margin is less than the instantaneous utility grid voltage.

10. The PV inverter according to claim 8, wherein the buck converter comprises no more than one high frequency switching device, and further wherein the no more than one high frequency switching device is the sole PV inverter switching device operating in a buck mode when the PV array voltage plus converter operating margin is greater than the instantaneous utility grid voltage.

11. The PV inverter according to claim 8, further comprising an adaptive digital controller configured to adjust a buck-boost switching frequency associated with the DC to AC converter in response to desired operational characteristics to achieve a PV inverter efficiency greater than that achievable using fixed switching frequency PV inverter techniques.

12. The PV inverter according to claim 11, wherein the desired operational characteristics are selected from PV array voltage levels, PV inverter ambient operating temperatures, PV inverter switching device temperatures, and utility grid power levels.

13. The PV inverter according to claim 8, wherein the PV inverter comprises no more than one high frequency switching device such that the PV inverter has less inherent EMI generation than a PV inverter comprising a plurality of high frequency switching devices.

14. A photovoltaic (PV) inverter configured to operate as a buck converter whenever an instantaneous utility grid voltage minus converter operating margin is lower than a PV array voltage and as a boost converter whenever the instantaneous utility grid voltage minus converter operating margin is higher than the PV array voltage, the PV inverter further comprising:
   a current unfolding output circuit configured to minimize the amount of DC current injected into the utility grid regardless of whether the PV array voltage plus converter margin is greater or lower than the utility grid voltage; and
   a stiffening capacitor between the PV array and the buck converter, the stiffening capacitor configured together with the buck converter to generate the rectified sine wave current in the absence of a DC link between the buck converter and the current unfolding circuit.

15. The PV inverter according to claim 14, wherein the buck converter comprises no more than one high frequency switching device and the current unfolding circuit comprises no more than two high frequency switching devices, and further wherein the no more than two high frequency switching devices are configured to high frequency switch only when the PV array voltage plus converter operating margin is less than the instantaneous utility grid voltage.

16. The PV inverter according to claim 14, wherein the buck converter comprises no more than one high frequency switching device, and further wherein the no more than one high frequency switching device is the sole PV inverter switching device operating in a high frequency switching mode when the PV inverter is operating in a buck mode.

17. The PV inverter according to claim 14, further comprising an adaptive digital controller configured to adjust a buck-boost switching frequency associated with the buck converter and current unfolding circuit in response to desired operational characteristics to achieve a PV inverter efficiency greater than that achievable using fixed switching frequency PV inverter techniques.

18. The PV inverter according to claim 17, wherein the desired operational characteristics are selected from PV array voltage levels, PV inverter ambient operating temperatures, PV inverter switching device temperatures, and grid power levels.

19. The PV inverter according to claim 14, wherein the PV inverter comprises no more than one high frequency switching device such that the PV inverter has less inherent EMI generation than a PV inverter comprising a plurality of high frequency switching devices.

* * * * *